(No Model.)
W. J. LEE & L. ROUAULT.
MEANS FOR SUPPLYING WATER TO POLISHING WHEELS.
No. 577,045. Patented Feb. 16, 1897.
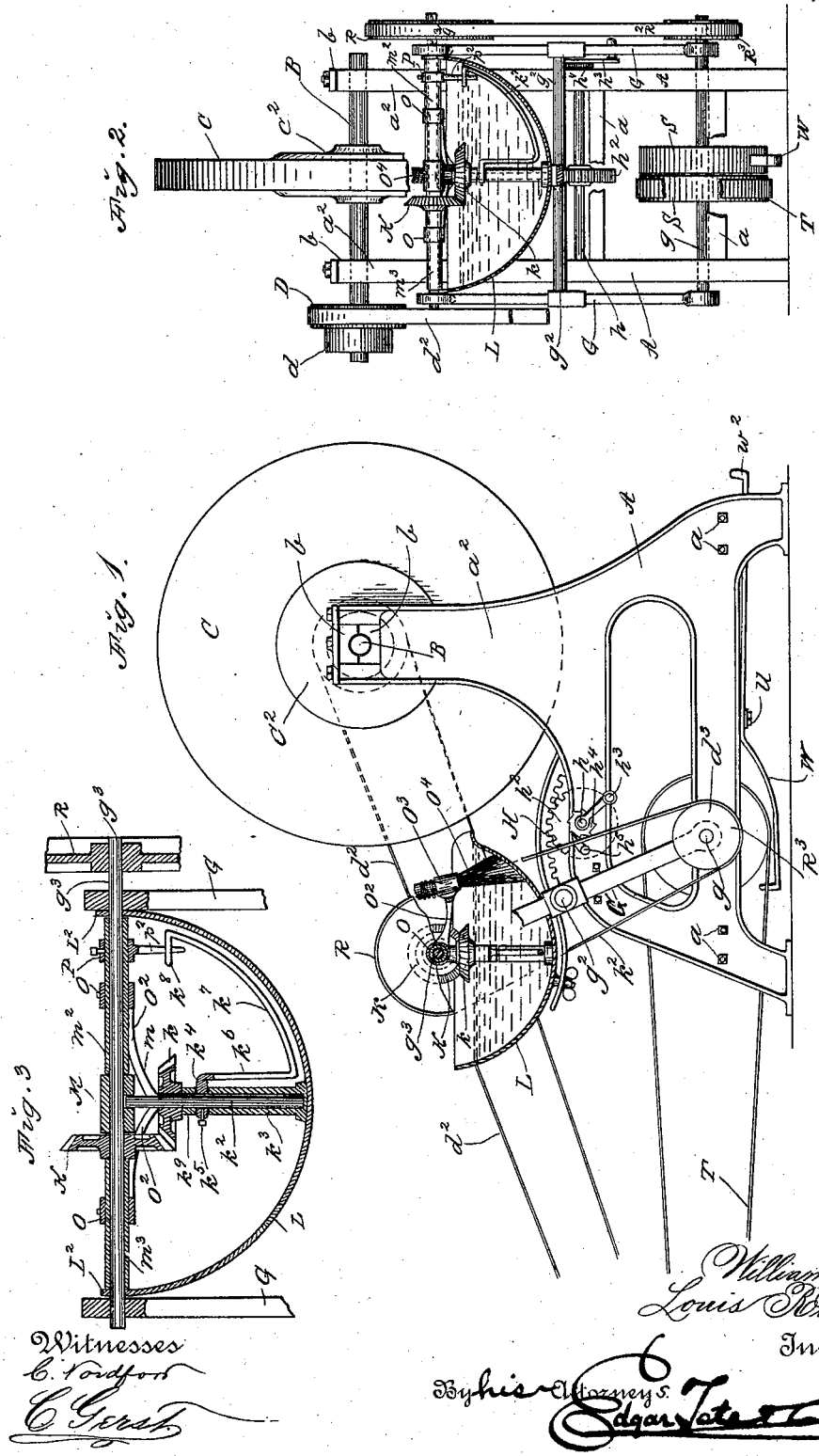
Witnesses
C. Vordfort
C. Gerst
William J. Lee.
Louis Rouault.
Inventors.
By his Attorneys
Edgar Tate

UNITED STATES PATENT OFFICE.

WILLIAM J. LEE, OF BROOKLYN, AND LOUIS ROUAULT, OF NEW YORK, N. Y.

MEANS FOR SUPPLYING WATER TO POLISHING-WHEELS.

SPECIFICATION forming part of Letters Patent No. 577,045, dated February 16, 1897.

Application filed April 22, 1896. Serial No. 588,572. (No model.)

*To all whom it may concern:*

Be it known that we, WILLIAM J. LEE, a citizen of the United States, residing at Brooklyn, in the county of Kings, and LOUIS ROUAULT, a citizen of the Republic of France, residing at New York, in the county of New York, State of New York, have invented certain new and useful Improvements in Means for Supplying Water or other Material to Polishing-Wheels, of which the following is a specification, reference being had to the accompanying drawings, forming a part thereof, in which similar letters of reference indicate corresponding parts.

This invention relates to means for supplying water or a solution composed of pumice-stone and water or other material to polishing-wheels; and the object thereof is to provide an improved device of this class which is automatic in operation and which is simple in construction, and by means of which a polishing-wheel, either of wood, emery, or other material, may be properly supplied at all times with water or with a solution of pumice-stone and water or any preferred material; and with these and other objects in view the invention consists in the construction, combination, and arrangement of parts, hereinafter described and claimed.

The invention is fully disclosed in the following specification, of which the accompanying drawings form a part, in which—

Figure 1 is a side view of a machine involving our invention, part of the construction being shown in section; Fig. 2, an end view thereof, in which part of the construction is also shown in section; and Fig. 3, a sectional detail of the construction.

In the practice of our invention we provide a suitable frame, which is composed of side plates A, which are of any desired shape or form and supported in any desired manner, and said side plates are connected by transverse bolts or bars $a$ in the usual manner, and at one end of each is an upwardly-directed arm or extension $a^2$, on which are mounted a shaft B, said shaft being mounted in suitable bearings, as shown at $b$, and mounted centrally on said shaft is a polishing-wheel C, which is provided with a hub $C^2$, through which the shaft passes, and said shaft B is also provided at one end with two pulley-wheels D and $d$, on one of which is mounted a belt $d^2$, which extends forward and is connected with a suitable engine or power wheel. (Not shown.) We also provide a movable frame which comprises two side bars G, the lower ends of which are mounted on a shaft $g$ and which are connected at about their middles by a shaft $g^2$ and the upper ends of which are connected by a shaft $g^3$, and the shafts $g$, $g^2$, and $g^3$ each extend transversely of the machine, the shafts $g^2$ and $g^3$ being above the side plates A of the frame and the shaft $g$ being mounted in the bottom thereof.

Connected centrally with the shaft $g^2$ is a curved rack-bar H, and passing through the frame beneath said rack-bar is a shaft $h$, on which is mounted a gear or ratchet wheel $h^2$, which is adapted to operate said rack-bar, and the end of said shaft $h$ is provided with a crank $h^3$, and mounted on said shaft adjacent to said crank is a ratchet-wheel $h^4$, and pivotally connected with the frame adjacent thereto is a pawl $h^5$, which operates in connection therewith.

Secured to the outer end of the rack-bar H is a cup-shaped or semispherical receptacle L, which is adapted to be moved toward or from the polishing-wheel C by means of the rack-bar H, and said receptacle L is also provided at each side with ears $L^2$, through which the shaft $g^3$ passes, and mounted on the shaft $g^3$ at one side of the center thereof is a beveled gear-wheel K, which operates in connection with a corresponding beveled gear-wheel $k$, which is mounted on a vertical shaft $k^2$, the lower end of which is set into a tubular socket $k^3$, above which is placed a collar $k^4$, which is secured to said shaft by a set-screw $k^5$, and said collar is provided with a depending rod $k^6$, to the lower end of which is secured a segmental arm $k^7$, which extends upwardly along the inner surface of the receptacle L and is provided with an inwardly-directed extension $k^8$.

Above the collar $k^4$ and between said collar and the gear-wheel $k$ is a tubular bearing $k^9$, and the upper end of the shaft $k^2$ is fitted into a tubular bearing $m$, formed on a sleeve M, on which is mounted the shaft $g^3$ and which extends from the gear-wheel K outwardly and to the right, as clearly shown in Fig. 3, and a similar tubular casing $m^3$ is placed on the shaft $g^3$ to the left of the gear-wheel K, as shown in said figure.

The shaft $g^3$ is free to revolve in the tubular casings $m^2$ and $m^3$, and mounted on said tubular casings are two collars or sleeves O, which are provided with arms $O^2$, which project inwardly and backwardly and which operate a tubular sleeve or head $O^3$, which carries a brush $O^4$, which projects downwardly into the receptacle L.

Mounted on the tubular casing $m^2$ is a collar P, to the lower side of which is secured an arm $p^2$, which projects downwardly in line with the inwardly-directed projection $k^8$ of the arm $k^7$, and mounted on one end of the shaft $g^3$ is a wheel R, over which passes a band $R^2$, which also passes over a corresponding wheel $R^3$ on the adjacent end of the shaft $g$, and said shaft $g$ is provided centrally with two separate pulleys or band-wheels S, one of which is loosely mounted on said shaft, with which a power-wheel T is adapted to be connected, and pivotally connected with the bottom of the frame at U is a lever W, which is adapted to serve as a belt-shifter and which extends backwardly to the rear of the machine, as shown at $W^2$; and it will be understood that the belt T may be shifted from one of the wheels S to the other whenever desired.

The operation will be readily understood from the foregoing description when taken in connection with the accompanying drawings and the following statement thereof.

It will be understood that when the machine is in operation the shaft B, the shaft $g^3$, and the shaft $g$ are constantly revolving, and that the shaft $g^3$ is free to revolve in the tubular casings $m^2$ and $m^3$, and that said shaft $g^3$ revolves the gear-wheel K, which revolves the gear-wheel $k$, which revolves the shaft $k^2$, which carries around the arm $k^7$, which is intended to operate as a mixer or stirrer of the solution in the receptacle L, and at each revolution of the mixer or stirrer $k^7$ the inwardly-directed projection $k^8$ thereof strikes the arm $p^2$ on the collar P, and said collar operates the tubular casings $m^2$ and $m^3$ and throws up the arms $O^2$ in the direction of the wheel C, and the brush $O^4$ is then brought in contact with said wheel at each revolution of the shaft $k^3$, and said wheel is thus kept constantly moist or wet by the solution in the receptacle L. It will also be understood that the frame by which the receptacle L is supported is free to swing on the shaft $g$, and that the position thereof may be regulated by the crank $h^3$ and the curved rack-bar H, by which the lower portion of the receptacle L is supported and retained in position.

Any desired solution may be placed in the receptacle L, and it will be seen that we accomplish the object of our invention by means of a device which is simple in construction and operation and which is well adapted to accomplish the result for which it is intended.

Having fully described our invention, we claim as new and desire to secure by Letters Patent—

1. In a machine for supplying water or a solution to a polishing-wheel, the combination with a suitable frame by which said polishing-wheel is supported, of a swinging frame mounted in the front of said polishing-wheel, and provided with a receptacle for receiving water or a polishing solution, said receptacle being provided with a stirrer and with a brush, which are operated for applying water or a solution to the polishing-wheel, and said frame and receptacle being provided with means whereby they may be adjusted toward or from the polishing-wheel, consisting of a rack-bar, connected with the bottom of said receptacle, and with said frame, and a shaft passing transversely through the frame and provided with a gear or ratchet wheel, by which the rack-bar is operated, substantially as shown and described.

2. In a machine for supplying water or a solution to a polishing-wheel, the combination with a suitable frame by which said polishing-wheel is supported, of a swinging and adjustable frame which supports the receptacle for water or a solution, said swinging frame being provided with a transverse shaft, on which is mounted a gear-wheel which operates in connection with another gear-wheel arranged on a vertical shaft in said receptacle, said vertical shaft being provided with a stirrer, substantially as shown and described.

3. In a machine for supplying water or a solution to a polishing-wheel, the combination with a suitable frame by which said polishing-wheel is supported, of a swinging and adjustable frame which supports the receptacle for water or a solution, said swinging frame being provided with a transverse shaft, on which is mounted a gear-wheel which operates in connection with another gear-wheel arranged on a vertical shaft in said receptacle, said vertical shaft being provided with a stirrer, and said transverse shaft being provided with tubular casings a brush-support secured thereto, and said brush-support being adapted to be operated by said stirrer so as to bring the brush in connection with the polishing-wheel, substantially as shown and described.

4. In a machine for supplying water or a solution to a polishing-wheel, the combination with a suitable frame by which the polishing-wheel is supported, of a swinging frame connected therewith, in front of said wheel, and provided with means for regulating the position thereof, a suitable receptacle for water or other material supported by said swinging frame, a shaft connected with said swinging frame and with said receptacle, and a shaft at the lower end of said frame, and a stirrer mounted in said receptacle and adapted to be operated by a shaft with which the receptacle is connected, substantially as shown and described.

5. In a machine for supplying water or a solution to a polishing-wheel, the combination with a suitable frame by which the polishing-wheel is supported, of a swinging frame connected therewith, in front of said wheel, and provided with means for regulating the position thereof, a suitable receptacle for water or other material, supported by said swinging frame, a shaft connected with said swinging frame and with said receptacle, and a shaft at the lower end of said frame, and a stirrer mounted in said receptacle and adapted to be operated by a shaft with which the receptacle is connected, said receptacle being also provided with a brush which is supported by tubular casings mounted on said shaft, with which the receptacle is connected, and said brush-support being adapted to be operated by said stirrer, substantially as shown and described.

6. In a machine for supplying water or a solution to a polishing-wheel, the combination with a suitable frame by which the polishing-wheel is supported, of a swinging frame connected therewith, and which supports a receptacle for the water or solution, said swinging frame being provided with means for adjusting the position thereof, and said receptacle being mounted in front of the polishing-wheel, a shaft extending transversely of the top of the receptacle, tubular casings mounted on said shaft, a brush-support connected thereto a stirrer also mounted in said receptacle and adapted to be operated by said shaft, and means connected with said stirrer and with said tubular casings for operating the brush-support, whereby the water or solution is applied to a polishing-wheel, substantially as shown and described.

In testimony that we claim the foregoing as our invention we have signed our names, in presence of the subscribing witnesses, this 20th day of April, 1896.

WILLIAM J. LEE.
LOUIS ROUAULT.

Witnesses:
CHARLES S. ROGERS,
C. GERST.